July 14, 1925.

T. BOVEY 1,546,348

CASING STRUCTURE FOR AUTOMOBILE HEATERS

Filed Dec. 30, 1921

Inventor
Thomas Bovey,
By Frank Thomason.
Attorney.

Patented July 14, 1925.

1,546,348

UNITED STATES PATENT OFFICE.

THOMAS BOVEY, OF CHICAGO, ILLINOIS.

CASING STRUCTURE FOR AUTOMOBILE HEATERS.

Application filed December 30, 1921. Serial No. 525,941.

*To all whom it may concern:*

Be it known that I, THOMAS BOVEY, a citizen of the United States, residing at Chicago, in the county of Cook and State of Illinois, have invented certain new and useful Improvements in Casing Structures for Automobile Heaters, of which the following is a full, clear, and exact description.

My invention relates to automobile heaters for which Letters Patent of the United States were granted to me December 20, 1921, and numbered 1,400,518, and particularly to the top-plate that covers the heat generating devices of the same.

The object of my invention is to provide a top-plate that will facilitate the ingress of the colder-air into and the discharge of the heater-air from the heater and to strengthen the same, and to do this without materially increasing the cost of manufacturing the plate. This I accomplish by the means hereinafter fully described, and as particularly pointed out in the claims.

Figure 2:
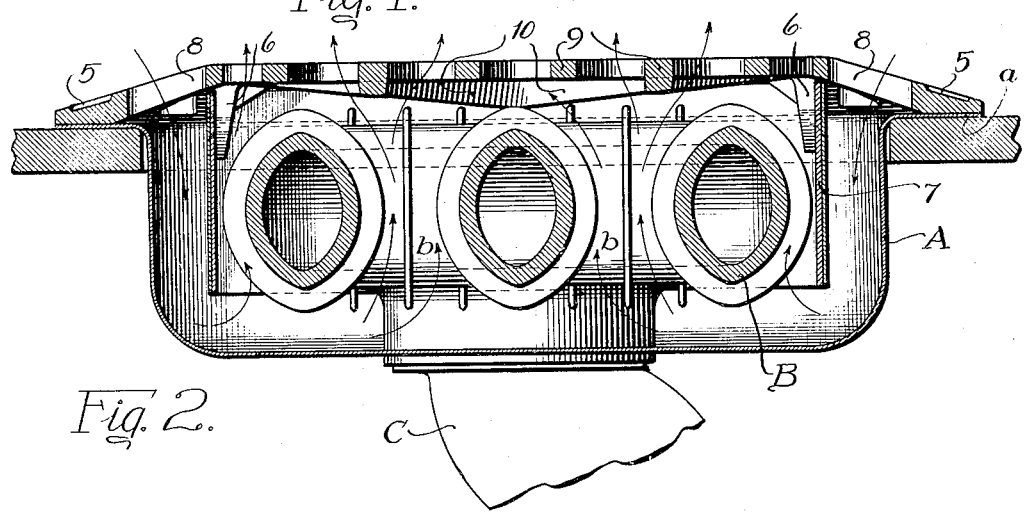
Figure 2 is a transverse section through the same and through the heater to which it is applied.
Figure 3:
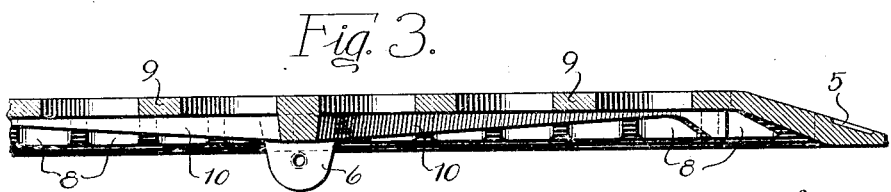
Figure 3 is a transverse section through a portion of the top-plate.

The heater shown in Figure 2 of the drawings, to which my improvements are applied, consists of a rectangular pan or receptacle A, the upper edges *a* of which are flanged and rest upon the margins of the hole in which the pan is seated, and the depth of the pan is such as to permit the heat generator B to be seated therein.

This heat generator B comprises a series of longitudinally disposed corresponding tubes, say, three, separated an equal distance apart and connected at their ends by crosstubes or heads *b*. The cross-tubes *b* at one end is connected to an inlet pipe C that enters the receptacle through its bottom, and the cross-tube or head at the opposite end of the heater is connected and discharges into a discharge-pipe, and the end is constructed similar to the inlet-pipe C, but is not shown.

The top-plate is of such dimensions that its margins 5 cover and correspond with the dimensions of the flanges upper edges *a* of the receptacle. From its edges the margins 5 slope upwards to a point *a* suitable distance within the vertical planes of the vertical sides of the receptacle, and it has, preferably, inside of the highest point of its inclined margins, lugs 6 depending downwards therefrom to which the upper margins of a vertically disposed drop-wall or curtain 7, is secured. The lower edge of this curtain 7 terminates in a horizontal plane at or below that of the lowermost segments of the heat generator tubes B, or about an inch above the bottom of the receptacle A.

The inclined margins 5 of the top-plate are provided with a series of perforations 8, over the space between the curtain 7 and the side-walls of the receptacle A and the cold air is drawn down through these perforations into the receptacle under the lower edge of the curtain. It then passes up against the sides of the heating tubes, and from thence out through the top 9, which latter is on a higher level than the margins, as indicated by the arrows in Figure 2 of the drawings and is perforated in the form of a grill to permit the discharge of heated air. The inclined and perforated margins of the top-plate performs a distinct function in that the air is taken in and discharged out through the top-plate at two levels so that interference of the in-coming cool air with the out-going heated air is avoided. The cool air is of greater specific gravity than the heated air and consequently is at the floor so that when the heater is in operation and this cool air moves to the plate there is a greater tendency for it to pass through the outer row of perforations than to run up the inclined margins to a point where it would interfere with the free discharge of the heated air passing out through the higher level perforations. The cool air is thus directed downwardly to and around the heating element where it becomes heated and rises through the central perforations that are at a higher level than those at the margin. By the addition of the wall between the heating element and the casing a more positive as well as a more extended circulation is obtained, but of course this wall is not indispensable in securing the results above pointed out.

Figure 1:
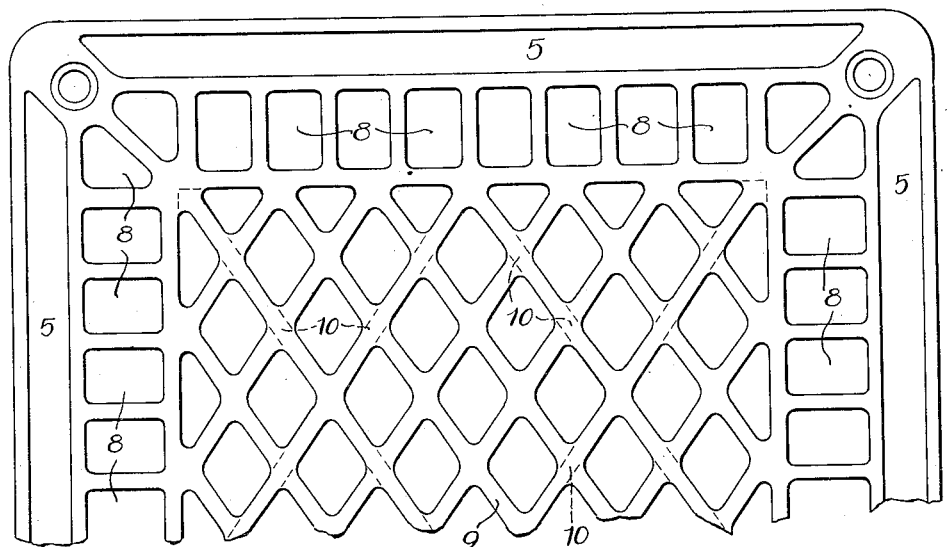
Figure 1 is a plan view of one end portion of the top-plate.

In order to strengthen the top-plate its underside is provided with a series of struts or ribs 10, the projection of which is greatest at the center of width of said top-plate and gradually decreases in depth as they extend toward the borders of the perforated central portion, where they disappear, and these ribs are crisscrossed as shown in dotted lines in Figure 1 of the drawings.

I do not desire to be confined to the exact design of the top-plate, as shown in the drawings, as it is possible to rearrange the perforations thereof and give the same a different appearance.

What I claim as new is:

1. The combination in a heater, of a receptacle adapted to be mounted in the floor of an automobile, a heating element in said receptacle, a top-plate, and a curtain depending from said top-plate, which latter has a level higher perforate central portion and downwardly inclined perforate marginal portions through which the cooler air enters into said receptacle between the sides thereof and said curtain.

2. A heater comprising a suitable receptacle adapted to be inserted in the floor of an automobile, a heater element within said receptacle, and a top plate having inclined marginal portions, said plate provided with perforations in its central and marginal portions whereby air taken in through the marginal perforations is brought into contact with said heating element and discharged in a heated condition through the central portion of said top plate.

3. A heater comprising a suitable receptacle adapted to be inserted in the floor of an automobile, a heating element within said receptacle, walls interposed between said element and adjacent portions of the receptacle and arranged to permit the passage of air from one side to the other thereof and a perforated top plate having perforated marginal portions that are inclined from the edges to permit air to be taken in and discharged at divers planes, whereby cool air taken in through said marginal portions is directed downwardly and passed from one side to the other of said plates where it is heated by said radiator and discharged through the central portions of said plate.

In witness whereof I, have hereunto set my hand this 15th day of December, 1921.

THOMAS BOVEY.

Witnesses:
FRANK I. THOMASON,
VIOLET WARDELL.